(12) United States Patent
Sun et al.

(10) Patent No.: US 8,972,711 B2
(45) Date of Patent: Mar. 3, 2015

(54) CPU CORE UNLOCKING DEVICE APPLIED TO COMPUTER SYSTEM

(75) Inventors: Pei-Hua Sun, Taipei (TW); Pai-Ching Huang, Taipei (TW); Yi-Min Huang, Taipei (TW); Meng-Hsiung Lee, Taipei (TW); Nan-Kun Lo, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 759 days.

(21) Appl. No.: 13/039,547

(22) Filed: Mar. 3, 2011

(65) Prior Publication Data
US 2011/0219211 A1    Sep. 8, 2011

Related U.S. Application Data

(60) Provisional application No. 61/310,715, filed on Mar. 5, 2010.

(51) Int. Cl.
G06F 9/24 (2006.01)
G06F 15/177 (2006.01)
G06F 9/06 (2006.01)
G06F 15/76 (2006.01)

(52) U.S. Cl.
CPC . *G06F 9/06* (2013.01); *G06F 15/76* (2013.01)
USPC ........ 713/100; 713/1; 713/2; 714/10; 714/11; 714/23

(58) Field of Classification Search
CPC .......... G06F 2221/2147; G06F 9/4429; G06F 9/4406; H04L 63/10
USPC .......................... 713/1, 2, 100; 714/10, 11, 23
See application file for complete search history.

(56) References Cited

U.S. PATENT DOCUMENTS

| 7,184,041 | B2 | 2/2007 | Heng et al. | |
| 7,240,222 | B1* | 7/2007 | Falik et al. | 713/300 |
| 7,515,302 | B2 | 4/2009 | Furuta | |
| 7,773,243 | B2 | 8/2010 | Ida et al. | |
| 7,793,026 | B1 | 9/2010 | Abraham et al. | |
| 2008/0059855 | A1* | 3/2008 | Whetsel | 714/727 |
| 2008/0288764 | A1* | 11/2008 | Lu | 713/2 |
| 2010/0217964 | A1* | 8/2010 | Peterka et al. | 713/2 |

FOREIGN PATENT DOCUMENTS

CN    101697198    4/2010

* cited by examiner

*Primary Examiner* — Michael J Brown
(74) *Attorney, Agent, or Firm* — Jianq Chyun IP Office

(57) ABSTRACT

A CPU core unlocking device applied to a computer system is provided. The core unlocking device includes a CPU having a plurality of signal terminals and a core unlocking executing unit having a plurality of GPIO ports connected with the corresponding signal terminals of the CPU. The GPIO ports of the core unlocking executing unit generate and transmit and transmit a combination of core unlocking signal to the signal terminals of the CPU to unlock the CPU core.

10 Claims, 4 Drawing Sheets

_US 8,972,711 B2_

CPU CORE UNLOCKING DEVICE APPLIED TO COMPUTER SYSTEM

CROSS REFERENCE TO RELATED PATENT APPLICATION

This application is entitled to the benefit of Provisional Patent Application Ser. No. 61/310,715 filed Mar. 5, 2010.

FIELD OF THE INVENTION

The invention relates to a computer system and, more particularly, to a computer system with a central processing unit (CPU) core unlocking function.

BACKGROUND OF THE INVENTION

In recent years, a multi-core CPU is developed. The more the cores is, the better efficiency of the CPU is. However, the price of the CPU is higher.

For example, a dual-core CPU, a three-core CPU and a quad-core CPU which are usually manufactured by the same semiconducting process. In other words, four cores are manufactured in a single chip at the same time. The number of the CPU cores is determined according to the operation condition in the testing procedure after manufactured.

For example, in the testing procedure, all the four cores operate normally; the CPU is indicated to be a quad-core CPU. In a similar way, when one of the four cores cannot operate stably, this core is locked, and the CPU is indicated to be a three-core CPU. When two cores cannot operate stably, the two cores are locked and the CPU is indicated to be a duel-core CPU.

FIG. 1 is a schematic diagram showing the connection between components of a conventional computer system. In the computer system 100, a north bridge chip 120 is connected between a CPU 110 and a south bridge chip 130. The south bridge chip 130 is further connected with a basic input output system (BIOS) 150. Currently, the CPU 110 supplied by the AMD Company has an advanced clock calibration (ACC) function to unlock the locked cores to enhance the work efficiency.

When the ACC function is executed, the south bridge chip 130 operates according to the setting and the control of the BIOS 150, and thus the south bridge chip 130 regulates the duty cycle of the clock signal of the CPU 110 directly and completes the ACC function to enhance the efficiency of the CPU 110. Moreover, when the ACC function is completed, the core unlocking function of the CPU 110 is completed. Since the cores of the CPU 110 increase, the operating rate and the operating stability is promoted greatly.

However, in order to achieve the core unlocking function of the CPU 110, the computer system manufacturer has to buy the same series of the north bridge chip 120 and the south bridge chip 130 manufactured by the same company and dispose them on the computer system 100. There are no other methods for unlocking the cores of the CPU 110 except the above method. Since the computer system manufacture should buy the same series of the north bridge chip 120 and the south bridge chip 130, the cost increases.

SUMMARY OF THE INVENTION

A computer system with a core unlocking function to a locked multi-core CPU is disclosed. A plurality of general purpose transmit output (GPIO) ports of an embedded controller or a south bridge chip generates and transmit a combination of core unlocking signal to the CPU to unlock the CPU core.

The computer system includes a CPU having a plurality of signal terminals; and a core unlocking executing unit having a plurality of GPIO ports connected with the corresponding signal terminals of the CPU. The GPIO ports of the core unlocking executing unit generate and transmit a combination of core unlocking signal to the signal terminals of the CPU to unlock the CPU core.

A motherboard with a CPU core unlocking function, cooperating with a CPU, includes a CPU socket having a plurality of signal terminals for being connected with the CPU and a core unlocking executing unit having a plurality GPIO ports connected with the corresponding signal terminals of the CPU socket. The GPIO terminals of the core unlocking executing unit generate and transmit a combination of core unlocking signal to the CPU via the signal terminals of the CPU socket to unlock a CPU core.

In an embodiment, the CPU is a multi-core CPU. The number of the CPU cores is not limited herein.

These and other features, aspects, and advantages of the present invention will become better understood with regard to the following description, appended claims, and accompanying drawings.

DETAILED DESCRIPTION OF THE PREFERRED EMBODIMENT

Figure 1:
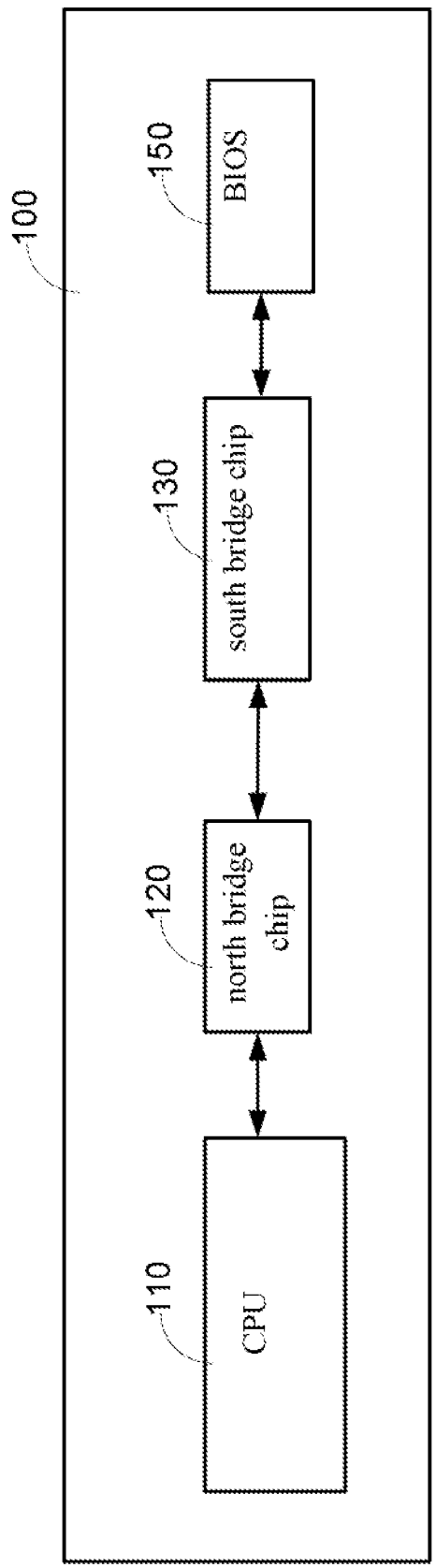
FIG. 1 is a schematic diagram showing the component connection of a conventional computer system.
Figure 2:
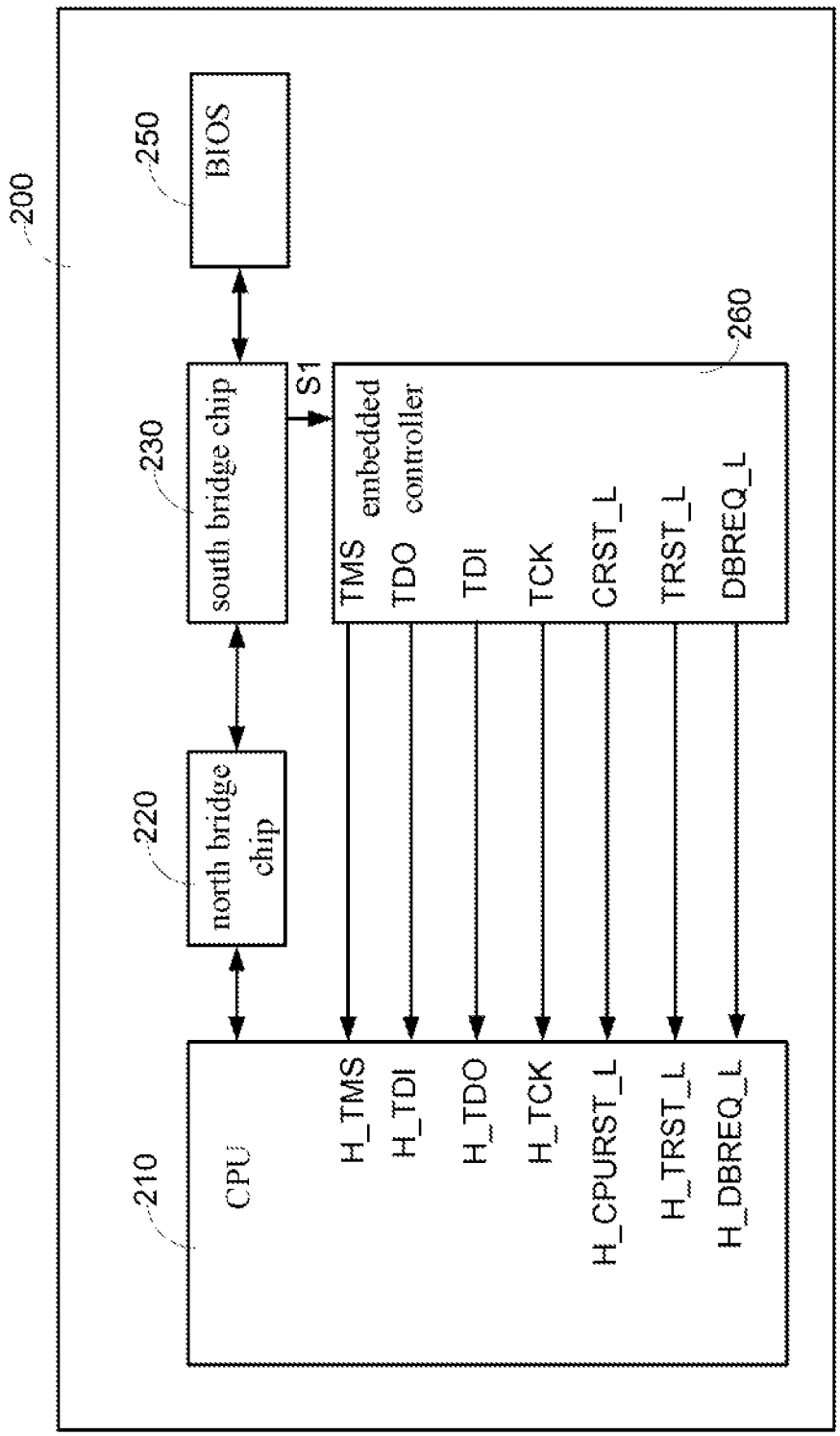
FIG. 2 is a schematic diagram showing a CPU core unlocking device of a computer system according to a first embodiment.

FIG. 2 is a schematic diagram showing a CPU core unlocking device of a computer system according to a first embodiment of the invention. In a computer system 200, a north bridge chip 220 is connected between a CPU 210 and a south bridge chip 230. The south bridge chip 230 is further connected with a basic input output system (BIOS) 250.

In the first embodiment, an embedded controller 260 is connected to the south bridge chip 230 and the CPU 210. The GPIO ports of the embedded controller 260 are used to generate and a combination of core unlocking signal and transmit the combination of core unlocking signal to the CPU 210 directly.

As shown in FIG. 2, the GPIO ports of the embedded controller 260 are 7 terminals in this embodiment, such as a TMS signal output terminal, a TDO signal output terminal, a TDI signal output terminal, a TCK signal output terminal, a CRST_L signal output terminal, a TRST_L signal output terminal and a DBREQ_L signal output terminal. The GPIO ports are connected with the corresponding signal terminals of the CPU 210 directly. In the embodiment, the corresponding signal terminals are a H_TMS signal terminal, a H_TDI signal terminal, a H_TDO signal terminal, a H_TCK signal terminal, a H_CPURST_L signal terminal, a H_TRST_L signal terminal and a H_DBREQ_L signal terminal. In other words, the seven signals terminal of the embedded controller 260 generate and transmit a combination of core unlocking signal to the corresponding signal transmit terminals of the CPU 210 to unlock the CPU core 210. Persons having ordinary skill in the art shall understand that the signal output terminals and the corresponding signal terminals are just an example, any combinations of the signal terminals and signals which can achieve the core unlocking function are not departing from the scope of the invention.

According to the first embodiment, after the computer system 200 is booted, the south bridge chip 230 sends a first core unlocking control signal S1 to the embedded controller 260 when the BIOS 250 outputs a control signal to the south bridge chip 230. Then, the embedded controller 260 outputs the combination of core unlocking signal to the CPU 210 for unlocking CPU 210.

Figure 3:
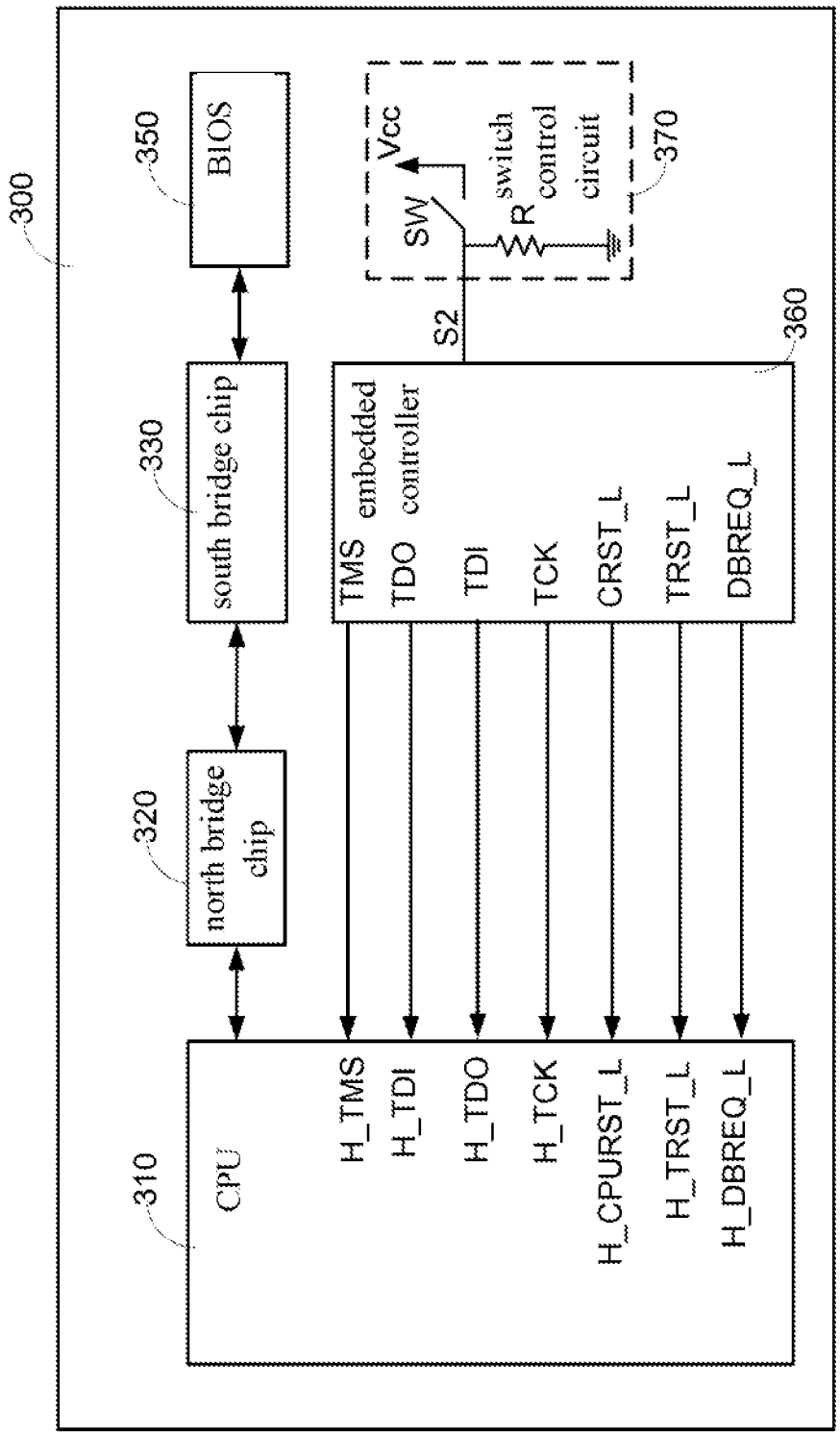
FIG. 3 is a schematic diagram showing a CPU core unlocking device of a computer system according to a second embodiment.

FIG. 3 is a schematic diagram showing a CPU core unlocking device of a computer system according to a second embodiment. In a computer system 300, a north bridge chip 320 is connected to a CPU 310 and a south bridge chip 330. The south bridge chip 330 is further connected with a BIOS 350. According to the second embodiment, an embedded controller 360 is connected between the CPU 310 and a switch control circuit 370. As described in the first embodiment, the embedded controller 360 has 7 GPIO ports. The embedded controller 360 is used to generate the combination of core unlocking signal and transmit the combination of core unlocking signal to the CPU 310 directly.

As described in the first embodiment, as shown in the FIG. 3, the TMS signal output terminal, TDO signal output terminal, TDI signal output terminal, TCK signal output terminal, CRST_L signal output terminal, TRST_L signal output terminal and the DBREQ_L signal output terminal of the embedded controller 360 are connected with the H_TMS signal terminal, H_TDI signal terminal, H_TDO signal terminal, H_TCK signal terminal, H_CPURST_L signal terminal, H_TRST_L signal terminal and the H_DBREQ_L signal terminal of the CPU 310 directly. In other words, the seven signals of the embedded controller 360 generate and transmit the combination of core unlocking signal to the corresponding signal terminal of the CPU 310 to unlock the CPU core 310.

Moreover, the switch control circuit 370 has a switch SW. The switch control circuit 370 generates a second core unlocking control signal S2 with different level by using the turn on and the turn off of the switch SW and output the second core unlocking control signal S2 to the embedded controller 360. In other words, users can use the switch SW to control the embedded controller 360 of the computer system 300 directly to generate the combination of core unlocking signal to the CPU 310 to unlock the CPU core 310.

According to the second embodiment, when the computer system 300 is booted, the switch control circuit 370 outputs the second core unlocking control signal S2 to the embedded controller 360 via the adjustment and the control of the users. The embedded controller 360 outputs the combination of core unlocking signal to the CPU 310 to unlock the CPU core 310.

As stated above, when the embedded controller 360 generates the combination of core unlocking signal, and transmits the core unlocking function to the CPU 310 is achieved via the embedded controller 360 regardless of the specification of the south bridge chip 330 and the north bridge chip 320. Hence, the core unlocking function of the CPU 310 is achieved without a specific south bridge chip and a specific north bridge chip. The cost of a computer system is reduced.

Moreover, CPU core unlocking devices in the first embodiment and the second embodiment may be applied to one computer system. In other words, the users can set the BIOS to make the south bridge chip output a first core unlocking control signal S1 to an embedded controller to output a combination of core unlocking signal, or the users also can directly adjust a switch control circuit of the computer system to output a second core unlocking control signal S2 to the embedded controller to output the combination of core unlocking signal. When the CPU receives the combination of core unlocking signal, it executes a CPU core unlocking function.

Figure 4:
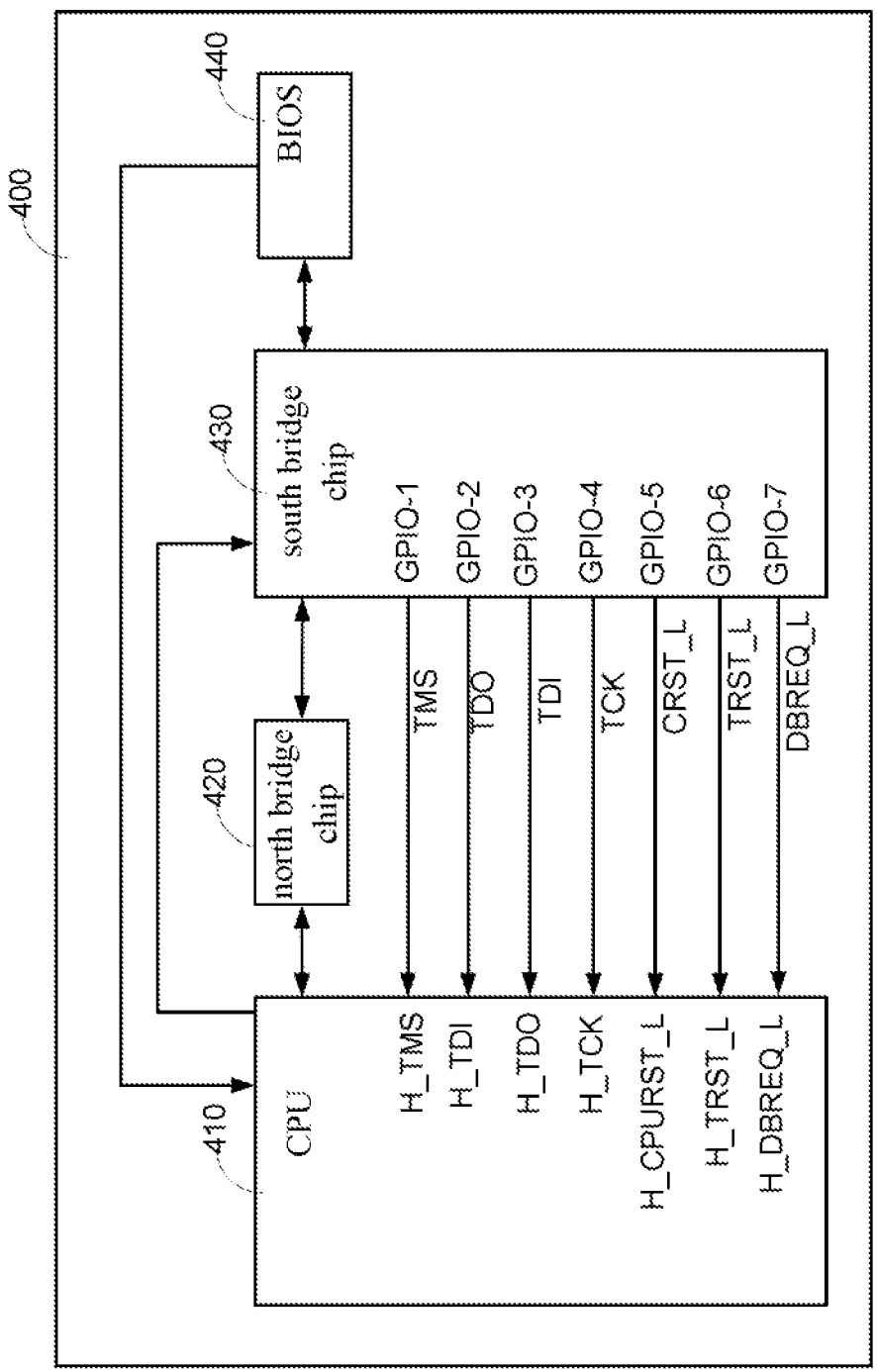
FIG. 4 is a schematic diagram showing a CPU core unlocking device of a computer system according to a third embodiment.

FIG. 4 is a schematic diagram showing a CPU core unlocking device of a computer system according to a third embodiment. In a computer system 400, a north bridge chip 420 is connected to a CPU 410 and a south bridge chip 430. The south bridge chip 430 is further connected with a BIOS 440. In the third embodiment, when the computer system 400 is booted, the CPU 410 executes a booting up function in the BIOS 440. The booting up function in the BIOS 440 is that the CPU 410 is used to execute a specific GPIO control code (or a command) to control the seven GPIO ports (GPIO-1 to GPIO-7) of the south bridge chip 430 to output a combination of core unlocking signal to the CPU 410, and then the CPU core 410 is unlocked.

In other words, as shown in FIG. 4, the seven GPIO ports generate a combination of simulate signal, the combination of simulate signal comprising a TMS signal, a TDO signal, a TDI signal, a TCK signal, a CRST_L signal, a TRST_L signal and a DBREQ_L signal, and output the seven signals to a H_TMS signal terminal, a H_TDI signal terminal, a H_TDO signal terminal, a H_TCK signal terminal, a H_CPURST_L signal terminal, a H_TRST_L signal terminal and a H_DBREQ_L signal terminal of the CPU 410 directly. In other words, the seven GPIO ports (GPIO-1 to GPIO-7) of the south bridge chip 430 generate and transmit the combination of core unlocking signal to the corresponding signal terminals of the CPU 410 to unlock the CPU core 410. Similarly, persons having ordinary skill in the art shall understand that the signal output terminals and the corresponding signal terminals are just an example, any combinations of the signal terminals and signals which can achieve the core unlocking function are not departing from the scope of the invention.

In the above embodiments, seven signals are used to generate the combination of core unlocking signal to unlock the CPU core. Four signals such as the TCK, the TMI, the TDI and the TRST also may be used to generate the combination of core unlocking signal to output to the H_TCK, the H_TMI, the H_TDI and the H_TRST_L signal terminals of the CPU to unlock the CPU core. Persons having ordinary skill in the art shall understand that the operation principle of the four signals combination is the same as that of other signal combinations, which is omitted herein.

To sum up, a computer system with a CPU core unlocking function is provided. The computer system can use a south bridge chip manufactured by any companies to execute a CPU core unlocking function. The cost of a computer system is reduced.

Furthermore, the invention also may be applied to a motherboard without installing a CPU. In other words, the CPU is not installed in a CPU socket. However, since the terminals of the CPU socket are connected with the GPIO ports of an embedded controller or the GPIO ports of a south bridge chip, the motherboard also supports a CPU core unlocking function. When the CPU is installed in the CPU socket on the motherboard, the core unlocking function may be executed. Further, the core unlocking executing unit is a GPIO chip could be controlled by CPU via LPC bus or smbus PCI etc.

Although the invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A computer system, comprising:
   a central processing unit (CPU) having a plurality of signal terminals and is a multi-core CPU; and
   a core unlocking executing unit having a plurality of general purpose transmit output (GPIO) ports connected with the corresponding signal terminals of the CPU;
   wherein the GPIO ports of the core unlocking executing unit generate and transmit a combination of core unlocking signal to the signal terminals of the CPU so as to unlock a locked CPU core to co-operate with at least one of unlocked CPU core.

2. The computer system according to claim 1, wherein the core unlocking executing unit is an embedded controller and the embedded controller generates the combination of core unlocking signal after the embedded controller receives a first core unlocking control signal from a south bridge chip of the computer system.

3. The computer system according to claim 1, wherein the core unlocking executing unit is an embedded controller and the embedded controller generates the combination of core unlocking signal after the embedded controller receives a second core unlocking control signal from a switch control circuit of the computer system.

4. The computer system according to claim 1, wherein the core unlocking executing unit is a south bridge chip, when the CPU executes the core unlocking function of a basic input output system (BIOS), the CPU controls the south bridge chip and the south bridge chip generate the combination of core unlocking signal.

5. The computer system according to claim 1, wherein the signal terminals of the CPU comprise a H_TMS signal terminal, a H_TDI signal terminal, a H_TDO signal terminal, a H_TCK signal terminal, a H_CPURST_L signal terminal, a H_TRST_L signal terminal and a H_DBREQ_L signal terminal.

6. A motherboard with a CPU core unlocking function cooperating with a CPU that is a multi-core CPU, comprising:
   a CPU socket having a plurality of signal terminals for being connected with the CPU; and
   a core unlocking executing unit having a plurality of GPIO ports connected with the corresponding signal terminals of the CPU socket;
   wherein the GPIO ports of the core unlocking executing unit generate and transmit a combination of core unlocking signal to the CPU via the signal terminals of the CPU socket, so as to unlock a locked CPU core to co-operate with at least one of unlocked CPU core.

7. The motherboard according to claim 6, wherein the core unlocking executing unit is an embedded controller and the embedded controller generates the combination of core unlocking signal after the embedded controller receives a first core unlocking control signal from a south bridge chip of the motherboard.

8. The motherboard according to claim 6, wherein the core unlocking executing unit is an embedded controller and the embedded controller generates the combination of core unlocking signal after the embedded controller receives a second core unlocking control signal from a switch control circuit of the motherboard.

9. The motherboard according to claim 6, wherein the core unlocking executing unit is a south bridge chip, when the CPU executes the core unlocking function of a BIOS, the CPU controls the south bridge chip and the south bridge chip generate the combination of core unlocking signal.

10. The motherboard according to claim 6, wherein the signal terminals in the CPU socket comprise a H_TMS signal terminal, a H_TDI signal terminal, a H_TDO signal terminal, a H_TCK signal terminal, a H_CPURST_L signal terminal, a H_TRST_L signal terminal and a H_DBREQ_L signal terminal.

* * * * *